July 15, 1969    SHINZABURO SUMIMOTO ET AL    3,455,925
PROCESS FOR PREPARING O,S-BIS(ALKOXYCARBONYL)THIAMINE
DERIVATIVES
Filed June 7, 1966                                  2 Sheets-Sheet 1

Free CET
(CHCl₃ extract)

Fig. 1

Free CET
(authentic sample)

Fig. 2

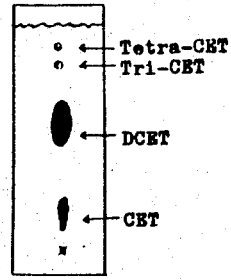

Free DCET
(CHCl₃ extract)

Fig. 3

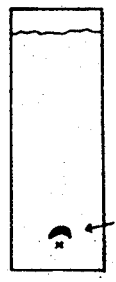

H₂O layer
(after extraction
of free DCET)

Fig. 4

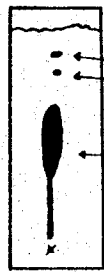

DCET·HCl
(CHCl₃ extract)

Fig. 5

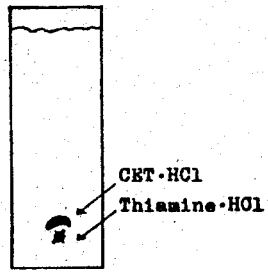

H₂O layer
(after extraction of
DCET·HCl)

Fig. 6

DCET·HCl·H₂O
(after treatment
with ethyl acetate)

Fig. 7

Ethyl acetate layer
(after treatment
with ethyl acetate)

Fig. 8

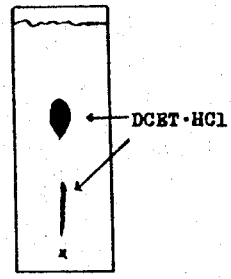

DCET·HCl·H₂O
(after recryst.
from acetone)

Fig. 9

Reaction of S-sodium thiamine with diethyl
pyrocarbonate in two steps.

 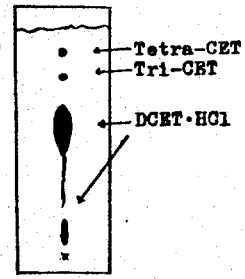
Fig. 10    Fig. 11
Reaction of S-sodium thiamine with ethyl chlorocarbonate by the known method.
 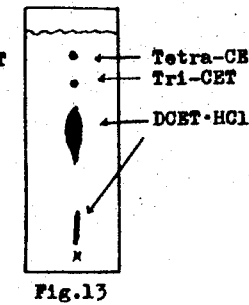
Fig. 12    Fig. 13
Reaction of diethyl pyrocarbonate in one step.

3,455,925
PROCESS FOR PREPARING O,S-BIS(ALKOXY-CARBONYL)THIAMINE DERIVATIVES

Shinzaburo Sumimoto and Kanji Tokuyama, Osaka, Manabu Fujimoto, Tokyo, and Takashi Maeda, Kitakatsuragi-gun, Nara Prefecture, Japan, assignors to Shionogi & Co., Ltd., Osaka, Japan
Filed June 7, 1966, Ser. No. 555,897
Claims priority, application Japan, Sept. 30, 1965, 40/59,873
Int. Cl. C07d 99/12, 51/42
U.S. Cl. 260—256.5           5 Claims

ABSTRACT OF THE DISCLOSURE

O,S-bis-(alkoxycarbonyl)-thiamine derivatives of high purity are prepared in very high yield by treating below room temperature an S-alkali metal salt of thiamine in aqueous solution with 1 to 1.2 mol equivalent of a dialkyl pyrocarbonate and repeating the treatment under the same conditions of temperature with another 1 to 1.2 mol equivalent of the dialkyl pyrocarbonate.

---

The present invention relates to a process for preparing bis(alkoxycarbonyl)thiamine derivatives. More particularly, it relates to an improvement in the production of O,S-bis(alkoxycarbonyl)thiamine and non-toxic salts thereof which are useful as the long-acting vitamin $B_1$ agents.

It has been already known that O,S-diacylthiamine derivatives can be prepared by reacting an acid salt of thiamine with carboxylic acid anhydride or carboxylic acid halide at non-acidic pH [U.S. Patent No. 2,752,348]. Further, the O,S-bis(alkoxycarbonyl)thiamine derivatives have been prepared by several methods, for instance, by reacting an S-alkali salt of thiol type thiamine with alkyl halogenocarbonate in the presence of a basic catalyst (e.g. triethylamine or sodium alkoxide) (hereinafter referred to as "halogenocarbonate method") [e.g. Chemical & Pharmaceutical Bulletin, vol. 10, pp. 1107 to 1112, (1962)], further by reacting the S-alkali salt of thiol type thiamine with alkyl nitrophenyloxycarbonate or alkyl thiocyanatocarbonate [British patent specification No. 944,641]. The halogenocarbonate method, although the reagent is the commercially most available, yields halogen ion or hydrohalogenic acid as a side product, which may necessarily reduce the basicity of the reaction mixture and further retard occasionally the alkoxycarbonylating reaction. Therefore, the said prior process is not an economical method for the production of O,S-bis(alkoxycarbonyl)thiamine derivatives. Further, by the halogenocarbonate method, there are produced considerable amounts of O,N,S-tri(alkoxycarbonyl)thiamine and a compound assumed as O,N,N,S-tetra(alkoxycarbonyl)thiamine in the course of the reaction, which lower the yield of the O,S-bis(alkoxycarbonyl)thiamine. Furthermore, it is very difficult to isolate respective products from the reaction mixture thereof according to the ordinary separating methods such as solvent extraction or recrystallization, because their properties are quite similar to each other and their amounts are substantial. The difficulty is undesirable in view of the fact that the thiamine compound which is used as a starting material in the manufacture of medicinal compositions are especially required to be pure. However, the above defects have been now overcome by the process of the present invention which produces selectively the O,S-bis(alkoxycarbonyl)thiamine derivatives as a main product.

As results of various investigations concerning the alkoxycarbonylation of thiamine compounds, it has been discovered by the present inventors that highly pure O,S-bis(alkoxycarbonyl)thiamine can be prepared in a quantitative yield by employment of 2.0 to 2.4 mol equivalent of pyrocarbonic acid diester in two steps to an aqueous solution of S-alkali metal salts of thiol type thiamine under cooling below room temperature and by the addition of 1.0 to 1.2 mol equivalent of alkali hydroxide in the latter step of the reaction.

Accordingly, it is an object of the present invention to provide a commercial process for producing highly pure O,S-bis(alkoxycarbonyl)thiamine derivatives in a quantitative yield. This and other objects and the manner in which they are accomplished will be apparent to those conversant with the art from the following description of the general class of compounds and the several specific examples and methods of obtaining them as presented herein.

The process of the present invention comprises reacting an S-alkali metal salt of a thiol type thiamine with 1.0 to 1.2 mol equivalent of a pyrocarbonic acid diester represented by the general formula:

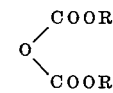

wherein R represents an alkyl group having one to five carbon atoms in an aqueous medium under cooling below room temperature to give an S-alkoxycarbonylthiamine represented by the general formula:

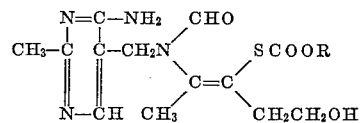

wherein R has the same significance as designated above and reacting the S-alkoxycarbonylthiamine with 1.0 to 1.2 mol equivalent of the pyrocarbonic acid diester represented by the general formula:

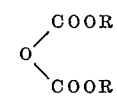

wherein R has the same significance as designated above in the presence of 1.0 to 1.2 mol equivalent of alkali hydroxide in an aqueous medium under cooling below room temperature to give an O,S-bis(alkoxycarbonyl)thiamine represented by the general formula:

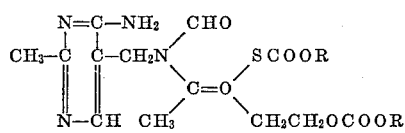

wherein R has the same significance as designated above.

The process of the present invention is thought to proceed stepwise through the first intermediary S-alkoxycarbonylthiamine and the second intermediary O-alkoxycarbonylthiamine S-alkali salt by an intermolecular [S→O] rearrangement in which the S-alkoxycarbonyl group of S-alkoxycarbonylthiamine is rearranged to the O-position by the reaction of alkali hydroxide, and it is represented by the following scheme:

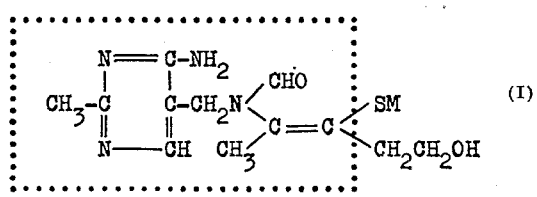

(I)

Note.—The partial structure encompassed by the dotted line in the above formula will be hereinafter summarized as "Thia."

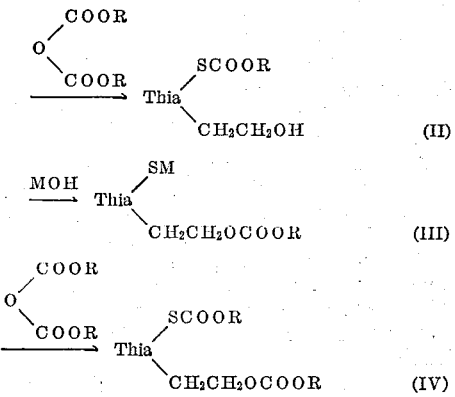

(II)

(III)

(IV)

wherein M represents an alkali metal (e.g. potassium, sodium or lithium) and R represents an alkyl group having one to five carbon atoms.

The starting material, alkali metal salt of thiol type thiamine of the Formula I, may be prepared by reacting a salt of thiamine (e.g. thiamine chloride hydrochloride, thiamine mononitrate, thiamine monothiocyanate, thiamine monophosphoric acid salt, thiamine mononaphthalene-1,5-disulfonic acid salt or thiamine monosulfate) with alkali metal hydroxide (e.g. potassium hydroxide, sodium hydroxide or lithium hydroxide) according to the conventional manner. For instance, S-sodium salt of thiol type thiamine is prepared by reacting thiamine chloride hydrochloride with 3.0 mol equivalent of sodium hydroxide in water and also prepared by reacting thiamine mononitrate with 2.0 mol equivalent of sodium hydroxide in water. This preparation of the starting material may be ordinarily effected in the range of temperature from 5 to 25° C. Although the each successive steps in the production of O,S-bis(alkoxycarbonyl)thiamine of the formula (IV) are illustrated independently in the following passages, these may usually be carried out subsequently to the preparations of the starting alkali salt of thiol type thiamine.

The pyrocarbonic acid diester adopted as an alkoxycarbonylating agent in the present process is a diester of pyrocarbonic acid

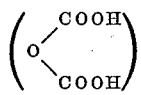

the industrial process for preparing this ester has been investigated since 1960 and it has been known that this reagent reacts with an organic compound having an active hydrogen atom such as thiol group and amino group in an amino acid [Bull. Soc. Chim. France, 1965, pp. 382 to 385]. Accordingly, pyrocarbonic acid diether is such a reagent as exhibits the powerful reactivity as an alkoxycarbonylating agent. The said pyrocarbonic acid diester can be readily prepared at a low cost such as by reacting an alkali salt of monoalkyl carbonate with alkyl halogenocarbonate and this reaction is represented by the following formulae:

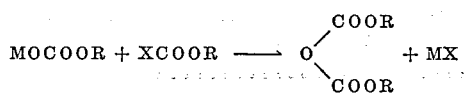

wherein R represents an alkyl group having one to fiive carbon atoms, M represents an alkali metal (e.g. potassium, sodium or lithium) and X represents a halogen atom.

According to the process of this invention, the starting S-alkali salt of thiol type thiamine of the Formula I is first allowed to react with 1.0 to 1.2 mol equivalent of the pyrocarbonic acid diester. The reaction may be effected under cooling below room temperature, that is, 25° C. favorably at −2 to 2° C. and with stirring to give an S-alkoxycarbonylthiamine of the Formula II. The present process can be effected with or without isolation of the S-alkoxycarbonylthiamine, but it is commercially more advantageous to effect the reaction without isolation of the S-alkoxycarbonylthiamine in view of high yield, rapid reaction time and small amount of solvent required. In the second step, after treatment of the S-alkoxycarbonylthiamine with 1.0 to 1.2 mol equivalent of alkali hydroxide, the result mixture is then subjected to a treatment with 1.0 to 1.2 mol equivalent of the pyrocarbonic acid diester. The reaction may proceed under cooling below room temperature, that is, 25° C. and with stirring in the same manner as described in the first step. Although the present process has hereinabove illustrated step by step, these steps may be effected successively without isolation of the intermediary compounds such as S-alkoxycarbonylthiamine or O-alkoxycarbonylthiamine. Further, this reaction can be performed batchwise or continuously.

The industrial advantages in the present process and reactivities of the pyrocarbonic acid diester in this process are shown as follows:

(1) Since pyrocarbonic acid diester is conspicuously reactive to an S-alkali salt of thiol type thiamine, the O,S-bis(alkoxycarbonyl)thiamine can be selectively and quantitatively prepared by employment of 2.0 to 2.4 mol equivalent of pyrocarbonic acid diester in successive two steps to an aqueous solution of S-alkali metal salt of thio type thiamine under cooling and by the previous addition of 1.0 to 1.2 mol equivalent of alkali hydroxide in the latter step of the reaction. For instance, results obtained by the thin layer chromatographic analysis (hereinafter referred to as "TLC") in the production of O,S-bis(ethoxycarbonyl)thiamine (hereinafter referred to as "DCET") by the present process will be shown in FIGURES 1 to 13 of the attached drawings together with those results obtained by employment of ethyl chlorocarbonate according to the known method and those of diethyl pyrocarbonate in one step for the purpose of illustrating how does the present process hold a unique advantage over the prior art.

(a) Analytical conditions are as follows:
Size of plate: 20 cm. x 5 cm.
Thickness of plate: 300μ.
Absorbent: silica gel (Merk).
Amount of samples: 1 to 10 μl. of a 0.1 to 5.0% solution.
Developing solvent: a mixture of chloroform and acetone (1:2 in volume).
Coloring agent: Dragendorff reagent.

(b) Brief explanation of the drawings:
FIGURE 1 shows the chromatogram in TLC of the extract obtained by shaking the reaction mixture with chloroform in the state of free S-ethoxycarbonylthiamine (hereinafter referred to as "CET") in the present reaction.

FIGURE 2 shows the chromatogram in TLC of an authentic sample of CET.

FIGURE 3 shows the chromatogram in TLC of the chloroform layer obtained by shaking the reaction mixture with chloroform in the state of free DCET in the present reaction.

FIGURE 4 shows the chromatogram in TLC of the aqueous solution after extraction of free DCET with chloroform in the present reaction.

FIGURE 5 shows the chromatogram in TLC of the DCET·HCl chloroform layer obtained by shaking the free DCET chloroform layer with 15% hydrochloric acid in the present reaction.

FIGURE 6 shows the chromatogram in TLC of the aqueous solution after extraction of DCET·HCl with chloroform in the present reaction.

FIGURE 7 shows the chromatogram in TLC of DCET·HCl·H₂O after washing with ethyl acetate in the present reaction.

FIGURE 8 shows the chromatogram in TLC of the ethyl acetate washings after treatment of DCET·HCl·H₂O with ethyl acetate in the present reaction.

FIGURE 9 shows the chromatogram in TLC of DCET·HCl·H₂O after recrystallization from acetone in the present reaction.

FIGURE 10 shows the chromatogram in TLC of the extract obtained by shaking the reaction mixture with chloroform in the state of free DCET in the reaction of S-sodium salt of thiamine with ethyl chlorocarbonate according to the method described in [Chemical & Pharmaceutical Bulletin, vol. 10, pp. 1107 to 1113 (1962)].

FIGURE 11 shows the chromatogram in TLC of the DCET·HCl·H₂O chloroform layer obtained by shaking the chloroform layer with 15% HCl in the reaction of FIGURE 10.

FIGURE 12 shows the chromatogram in TLC of the extract obtained by shaking the reaction mixture with chloroform in the state of free DCET in the reaction of thiamine mononitrate with diethyl pyrocarbonate in one step.

FIGURE 13 shows the chromatogram in TLC of the DCET·HCl·H₂O chloroform layer obtained by shaking the free DCET chloroform layer with 15% hydrochloric acid in the reaction of FIGURE 12.

(c) Conclusion:

In the known method of employing ethyl chlorocarbonate and that of diethyl pyrocarbonate in one step, there is produced a considerable amount of undesirable side product which cannot be readily separated and usually causes the poor yield of the end product. On the other hand, according to the process of this invention, the DCET can be prepared in a high purity with a small amount of side product which may be readily removed as is clearly understood by the drawing.

(2) The present reaction being effected in an aqueous medium under cooling, will result in a high yield of desired product but there may still be a small amount of side products such as carbon dioxide, alcohol and alkali metal salt of monoalkyl carbonate. Since the major portion of carbon dioxide among them will be evaporated and come out of the reaction system automatically, the alcohol and the remainder of carbon dioxide are inherently dissolved in the water, and the alkali metal salt of monoalkyl bicarbonate will also gradually decompose into alkali bicarbonate and alcohol which will finally be dissolved in the water, the resultant O,S-bis(alkoxycarbonyl)thiamine can be readily isolated from the reaction mixture by extracting with a suitable solvent such as chloroform. Still, even though a small amount of O,N,S-tri(alkoxycarbonyl)thiamine and a compound which may be assumed as O,N,N,S-tetra(alkoxycarbonyl)thiamine may be liable to be side-produced depending upon the reaction conditions employed, and these side-products can be removed simply by a conventional purifying manner such as recrystallization or washing with a suitable solvent (e.g. ethyl acetate).

Still, the said tri(alkoxycarbonyl)thiamine and tetra(alkoxycarbonyl)thiamine are thought to be produced, for instance, in the production of DCET according to the following process:

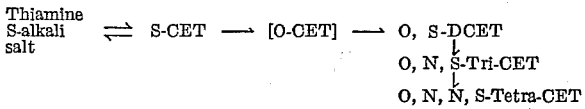

wherein Tri-CET represents tri(ethoxycarbonyl)thiamine and Tetra-CET represents tetra(ethoxycarbonyl)thiamine. It has been discovered by the present inventors that hard reaction conditions such as heating and excess of the reagent increase the yields of the tri(alkoxycarbonyl)thiamine and tetra(alkoxycarbonyl)thiamine and that the compound assumed to be tetra(alkoxycarbonyl)thiamine in instable and readily converted into tri(alkoxycarbonyl)thiamine by decomposition.

(3) The present process shows a conspicuous advance of yield in comparison with those of the known methods. For instance, although only about 45% of crude yield is achieved in the prior halogenocarbonate method, more than 95% of crude yield (purity: 94.9 to 95.3%) can be established in the present process.

(4) In the present process, addition of the reagent can be effected at a time and it does not require a dropwise manner. Further, the reaction rate is so rapid that the time required for the reaction and post treatment will be much shortened in comparison to any of those of the known halogenocarbonate method.

(5) Since the present reaction is less exothermic than the halogenocarbonate method, any special cooling installation is not required for even in a mass treatment.

(6) Although in the halogenocarbonate method a severe reaction time and stirring conditions are required for the industrial production, these requirements are completely eliminated, but a low reaction temperature and a mild stirring are required in the present process.

(7) The halogenocarbonate is much irritative, especially lachrymatory and has a considerable toxicity, whereas the pyrocarbonic acid diester is aromatic and has little toxicity and no irritation. Therefore, it is profitable to employ a safe and harmless reagent in the treatment of the industrial production.

The thus obtained O,S-bis(alkoxycarbonyl)thiamine derivatives and non-toxic salts thereof are useful as so-called long-acting vitamin B₁ agents. It is noted that, when orally administered, these compounds are rapidly absorbed from the intestinal canal and can maintain a high concentration of vitamin B₁ in the blood for a long time.

Presently preferred and practical embodiments of the present invention are illustratively shown in the following examples. The relationship of parts by weight to parts by volume is the same as that between grams and milliliters. Temperatures are set forth in degrees centigrade.

Example 1

Into a four-necked flask (500 parts by volume) equipped with a stirrer, a thermometer and a dropping funnel, there are added thiamine mononitrate (32.74 parts by weight) and 5% sodium hydroxide solution (168.0 parts by weight) under stirring and the resultant mixture is stirred at 20 to 21° C. for 1.5 to 2.0 hours for opening the thiazolium ring to prepare S-sodium salt of thiol type thiamine.

Then, the above prepared solution of S-sodium salt of thiol type thiamine is cooled at 0 to 2° C. and diethyl pyrocarbonate (17.82 parts by weight) is poured at one try into the reaction mixture. The resultant mixture is stirred at 0 to 2° C. for an hour to precipitate S-ethoxycarbonylthiamine as crystals. An aqueous 5% sodium hydroxide (96.0 parts by weight) is added to the reaction mixture and the resultant mixture is stirred at 0 to 2° C. for 15 minutes to dissolve crystals of S-ethoxycarbonylthiamine. Further, the reaction mixture is mixed with diethyl pyrocarbonate (17.82 parts by weight) while stirring and the resultant mixture is stirred at 0 to 2° C. for 2 hours. As results of stirring, the precipitated oily substance is soon converted into thin needles.

After completing the reaction, the reaction mixture is shaken with chloroform (150 parts by volume) and then with the additional amount (100 parts by volume) of chloroform successively, and in each case the formed aqueous layers are discarded after the absence of O,S-bis(ethoxycarbonyl)thiamine is confirmed by the thin layer chromatography. The chloroform layers are then combined and shaken well with 15% hydrochloric acid (36.48 parts by weight) for formation of the hydrochloride. The acidic aqueous layer is salted out with sodium hydrochloride and shaken with chloroform (30 parts by volume). The latter chloroform layer is combined with the former chloroform layer. The chloroform layer is dried over anhydrous sodium sulfate and the chloroform is evaporated at 50 to 60° C. under reduced pressure. The residue is transmitted into an open vessel and the residual solvent is evaporated gradually at room temperature. After being allowed to stand at room temperature overnight, the obtained substance on the vessel is moistened and converted into crystalline hydrate, which is then dried under reduced pressure to give O,S-bis(ethoxycarbonyl) thiamine hydrochloride monohydrate (45.78 to 46.22 parts by weight) as crystals melting at 112.5 to 119.5° C. Crude yield: 95.18 to 96.09%. Purity: 94.9 to 95.3%. This substance is proved to be almost pure substance by the coloring test with Dragendorff reagent or conc. sulfuric acid in the thin layer chromatography, but a spot of O,N,S-tri(ethoxycarbonyl)thiamine (M.P. 94 to 95° C.) is slightly observed and another spot assumed to be O,N,N,S-tetra(ethoxycarbonyl)-thiamine is much more slightly observed. The chromatogram of this substance is shown is FIGURE 5.

The said crude crystals are treated with ethyl acetate (170 parts by volume) to give 99.2 to 100.7% purity of crystals (42.49 to 43.03 parts by weight) melting at 119 to 119.5° C. This substance shows a single spot of O,S-bis(ethoxycarbonyl) - thiamine hydrochloride monohydrate in the thin layer chromatography, and no other spot such as O,N,S-tri(ethoxycarbonyl)thiamine or O,N,N,S-tetra(ethoxycarbonyl)thiamine is observed. This chromatogram is shown in FIGURE 7. This substance is recrystallized from acetone for arranging the shape of crystals to give colorless prisms melting at 121 to 123° C. (decomp.). The chromatogram of the prisms shows a single spot of O,S-bis(ethoxycarbonyl)thiamine hydrochloride monohydrate in the thin layer chromatography, as shown in FIGURE 9.

Note.—Purity assay was obtained by treating 1 ml. of a solution of the sample in 0.01 N hydrochloric acid with 1 ml. of 1 N sodium hydroxide at 30° C. for 5 minutes, adding 1.5 ml. of 1 N hydrochloric acid to give the resultant solution and applying the thiochrome fluorescence method provided for in Japanese Pharmacopeiae VII [e.g. Vitamin, vol. 25, pp. 478 to 482 (1962)].

Example 2

To a solution of thiamine chloride hydrochloride (33.7 parts by weight) in water (44 parts by volume), there is added 10% sodium hydroxide (124.0 parts by weight), and the resultant mixture is stirred at 20 to 21° C. for 2 hours. Under cooling at 0 to 2° C. and with stirring, the mixture is combined with diethyl pyrocarbonate (17.82 parts by weight) and the resultant mixture is stirred at 0 to 2° C. for an hour. Further, there are added 5% sodium hydroxide (96.0 parts by weight) and then diethyl pyrocarbonate (17.82 parts by weight), and the resultant mixture is stirred at 0 to 2° C. for 2 hours. The reaction mixture is treated in the same manner as in Example 1 to give O,S-bis(ethoxycarbonyl)thiamine hydrochloride monohydrate (42.90 parts by weight).

Example 3

Thiamine chloride hydrochloride (33.7 parts by weight) is reacted with di-n-butyl pyrocarbonate (B.P. 115 to 116° C./6 mm. Hg, $d_4^{25}$ 0.9817) (41.8 parts by weight) in the same manner as in Example 1 to give O,S-bis(n-butyloxycarbonyl)thiamine hydrochloride monohydrate (49.95 parts by weight) as crystals melting at 86 to 88° C.

Example 4

S-sodium salt of thiol type thiamine dihydrate is allowed to react with dimethyl pyrocarbonate (B.P. 46° C./5 mm. Hg, $d_4^{20}$ 1.2585, $n_D^{20}$ 1.3950) in the same manner as in Example 1 to give O,S-bis(methoxycarbonyl)thiamine as colorless plates melting at 139° (decomp.).

Example 5

Into a four-necked flask (500 parts by volume) equipped with a stirrer, a thermometer and a dropping funnel, there are added thiamine mononitrate (32.74 parts by weight) and 5% sodium hydroxide solution (168.0 parts by weight) under cooling below 10° C. with stirring, and the resultant mixture is stirred at 8 to 12° C. for 2.0 hours for opening the thiazolium ring to give S-sodium salt of thiol type thiamine.

Then, the above prepared S-sodium salt of thiol type thiamine solution is cooled at −1 to 1° C. and diethyl pyrocarbonate (17.82 parts by weight) is poured into the reaction mixture. The resultant mixture is stirred at −1 to 1° C. for 2 hours to precipitate S-ethoxycarbonylthiamine as crystals.

After completing the reaction, the reaction mixture is shaken with chloroform (150 parts by volume) and then with the additional amount (100 parts by volume) of chloroform. The chloroform layers are combined, and become gelatinous gradually. The gelatinous substance is collected by filtration and washed sufficiently with 99% ethanol (about 100 parts by volume) for the separation of the insoluble part (thiamine mononitrate) (0.65 parts by weight) from the ethanolic solution. The ethanolic solution is combined with the chloroform layer, and the mixture is dried over anhydrous sodium sulfate. The solvent is evaporated under reduced pressure at 50 to 60° C. on a water both to give S-ethoxycarbonylthiamine (34.11 parts by weight) as crystals melting at 134.0 to 134.5° C. (decomp.). Yield: 96.25%. Purity: 96.7%.

The thus obtained S-ethoxycarbonylthiamine (34.11 parts by weight) is mixed with 5% sodium hydroxide (96 parts by weight) and the reaction mixture is stirred at −1 to 1° C. for half an hour for dissolving the crystals of S-ethoxycarbonylthiamine. To the above solution, there is added diethyl pyrocarbonate (17.82 parts by weight) under stirring and with cooling at −1 to 1° C., and the resultant mixture is treated in the same manner as in Example 1 to give O,S-bis(ethoxycarbonyl)thiamine almost quantitatively.

What is claimed is:

1. Process for preparing O,S-bis(alkoxycarbonyl)thiamine derivatives which comprises reacting an S-alkali metal salt of thiol type thiamine with 1.0 to 1.2 mol equivalent of a pyrocarbonic acid diester represented by the general formula:

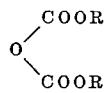

wherein R represents an alkyl group having one to five carbon atoms in an aqueous medium under cooling below room temperature to give an S-alkoxycarbonylthiamine represented by the general formula:

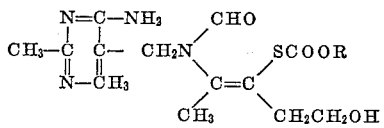

wherein R has the same significance as designated above and reacting the S-alkoxycarbonylthiamine with 1.0 to 1.2 mol equivalent of the pyrocarbonic acid diester represented by the general formula:

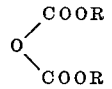

wherein R has the same significance as designated above in the presence of 1.0 to 1.2 mol equivalent of alkali hydroxide in an aqueous medium under cooling below room temperature to give an O,S-bis(alkoxycarbonyl)thiamine represented by the general formula:

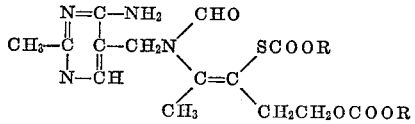

wherein R has the same significance as designated above.

2. Process for preparing O,S-bis(ethoxycarbonyl)thiamine derivatives which comprises reacting an S-alkali metal salt of thiol type thiamine with 1.0 to 1.2 mol equivalent of diethyl pyrocarbonate in an aqueous medium under cooling below room temperature to give S-ethoxycarbonylthiamine and reacting the S-ethoxycarbonylthiamine with 1.0 to 1.2 mol equivalent of diethyl pyrocarbonate in the presence of 1.0 to 1.2 mol equivalent of alkali hydroxide in an aqueous medium under cooling below room temperature.

3. Process according to claim 1, wherein R is methyl group.

4. Process according to claim 1, wherein R is n-butyl group.

5. Process according to claim 1, in which the cooling is from −1 to 10° C.

References Cited

FOREIGN PATENTS 690,732   7/1964   Canada.

OTHER REFERENCES

Thoma et al., Ann., vol. 624 (1959), pp. 30–61.

ALEX MAZEL, Primary Examiner

R. J. GALLAGHER, Assistant Examiner

U.S. Cl. X.R.

424—255